(12) United States Patent
Sakai

(10) Patent No.: US 9,274,265 B2
(45) Date of Patent: Mar. 1, 2016

(54) SURFACE LIGHT SOURCE APPARATUS AND DISPLAY APPARATUS USING SAME

(75) Inventor: Seiji Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 767 days.

(21) Appl. No.: 13/389,520

(22) PCT Filed: Nov. 5, 2010

(86) PCT No.: PCT/JP2010/069731
§ 371 (c)(1),
(2), (4) Date: Feb. 8, 2012

(87) PCT Pub. No.: WO2011/055795
PCT Pub. Date: May 12, 2011

(65) Prior Publication Data
US 2012/0140519 A1    Jun. 7, 2012

(30) Foreign Application Priority Data
Nov. 9, 2009    (JP) ................................. 2009-255710

(51) Int. Cl.
*F21V 7/04*    (2006.01)
*F21V 8/00*    (2006.01)

(52) U.S. Cl.
CPC .............. *G02B 6/0073* (2013.01); *G02B 6/002* (2013.01); *G02B 6/0016* (2013.01); *G02B 6/0021* (2013.01); *G02B 6/0031* (2013.01); *G02B 6/0083* (2013.01); *G02B 6/0085* (2013.01)

(58) Field of Classification Search
CPC .... G02B 6/0016; G02B 6/002; G02B 6/0021; G02B 6/0085; G02B 6/0031

USPC ......................................................... 362/608
See application file for complete search history.

(56) References Cited

U.S. PATENT DOCUMENTS

| 6,964,500 B2 | 11/2005 | Sakai |
| 7,229,198 B2 | 6/2007 | Sakai et al. |
| 7,350,951 B2 | 4/2008 | Sakai et al. |

(Continued)

FOREIGN PATENT DOCUMENTS

| CN | 1521541 A | 8/2004 |
| CN | 2682444 Y | 3/2005 |

(Continued)

OTHER PUBLICATIONS

WO 2008/047285 A1 Ijzerman et al. Published Apr. 24, 2008.*

(Continued)

*Primary Examiner* — Andrew Coughlin
(74) *Attorney, Agent, or Firm* — Oblon, McClelland, Maier & Neustadt, L.L.P.

(57) ABSTRACT

A surface light source apparatus capable of keeping a high in-plane brightness uniformity and a high light utilization efficiency without increasing the size of a frame, and also to provide a display apparatus including the surface light source apparatus. The surface light source apparatus includes a point light source, and a light guide plate having a hole formed near first side surface that is one side surface thereof, the hole being formed at a position where the point light source is to be arranged. The first side surface of the light guide plate has, in a portion thereof near the hole, a prism having a saw-toothed shape in a cross-section thereof parallel to a front surface of the light guide plate.

18 Claims, 9 Drawing Sheets

(56) References Cited

U.S. PATENT DOCUMENTS

| | | |
|---|---|---|
| 7,384,179 B2 | 6/2008 | Sakai |
| 7,393,128 B2 | 7/2008 | Sakai et al. |
| 7,441,938 B2 | 10/2008 | Sakai et al. |
| 7,604,389 B2 | 10/2009 | Sakai et al. |
| 7,641,376 B2 | 1/2010 | Sakai et al. |
| 7,762,705 B2 | 7/2010 | Sakai et al. |
| 2006/0077685 A1* | 4/2006 | Hsieh et al. ............ 362/558 |
| 2006/0256578 A1 | 11/2006 | Yang et al. |
| 2006/0291183 A1* | 12/2006 | Nishiyama et al. ....... 362/26 |
| 2008/0211990 A1 | 9/2008 | Sakai |
| 2008/0291694 A1 | 11/2008 | Sakai et al. |
| 2010/0079980 A1 | 4/2010 | Sakai |

FOREIGN PATENT DOCUMENTS

| | | | |
|---|---|---|---|
| CN | 1862335 A | 11/2006 | |
| CN | 201298119 Y | 8/2009 | |
| JP | 58-138903 | 9/1983 | |
| JP | 2000-30520 | 1/2000 | |
| JP | 2004-355889 | 12/2004 | |
| JP | 2004355889 A * | 12/2004 | ............ F21V 8/00 |

OTHER PUBLICATIONS

English Translation of Yoneda JP2004355889.*
U.S. Appl. No. 13/577,263, filed Aug. 6, 2012, Sakai.
International Preliminary Report on Patentability and Written Opinion issued Jun. 12, 2012 in PCT/JP2010/069731.
U.S. Appl. No. 14/162,254, filed Jan. 23, 2014, Sakai.
Office Action issued Feb. 12, 2013 in Japanese Application No. 2011-539404 (Partial English Translation).
Office Action and Search Report issued on Dec. 31, 2014 in the corresponding Chinese Patent Application No. 201080050670.4 (with English Translation).
Combined Chinese Office Action and Search Report issued Jun. 25, 2015 in Patent Application No. 201080050670.4 (with partial English language translation).
International Search Report issued Feb. 15, 2011 in PCT/JP2010/069731.
Combined Chinese Office Action and Search Report issued Jul. 3, 2014 in Patent Application No. 201080050670.4 (with partial English language translation).
Combined Chinese Office Action and Search Report issued Dec. 2, 2013 in Patent Application No. 201080050670.4 (with partial English language translation).

* cited by examiner

F I G . 1
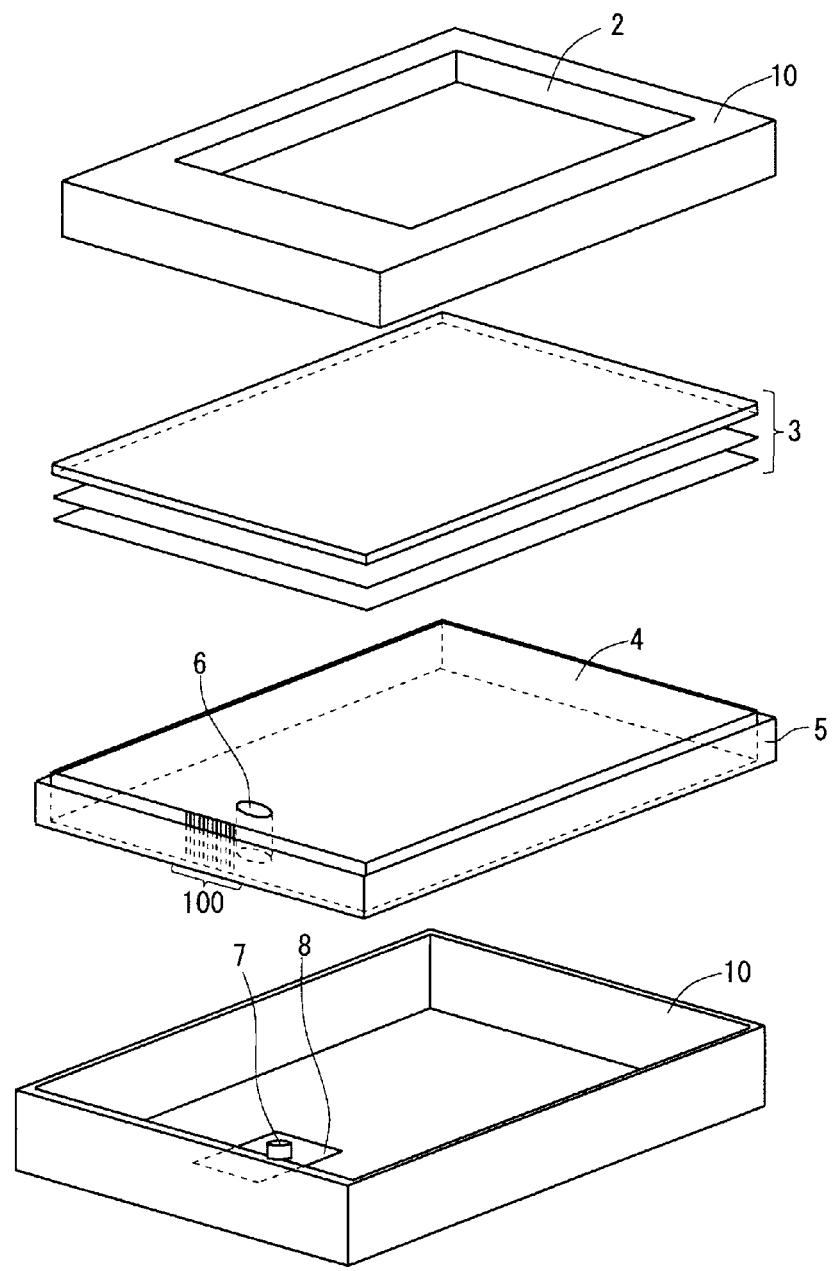

F I G . 5
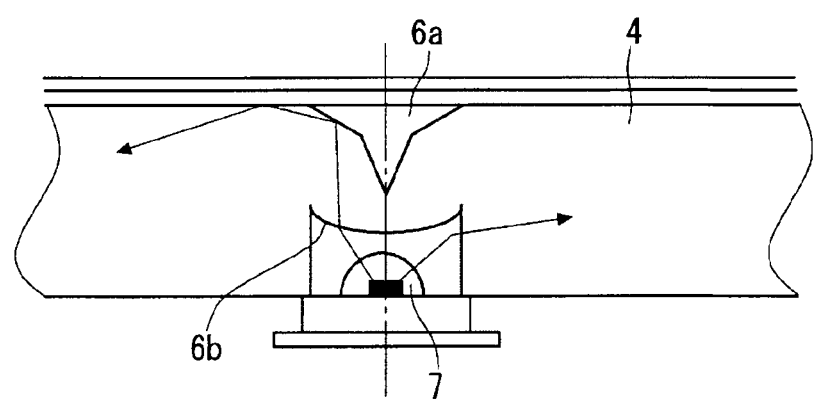

F I G . 7
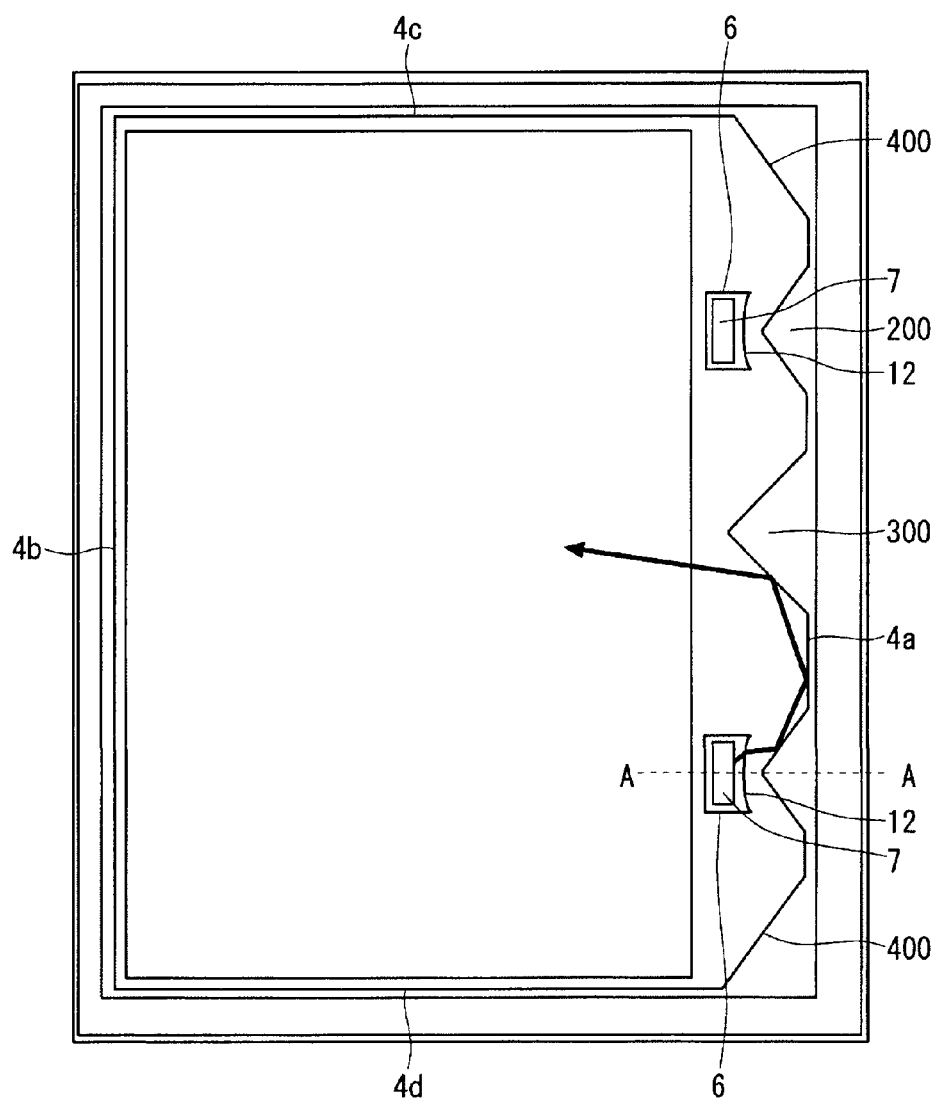

SURFACE LIGHT SOURCE APPARATUS AND DISPLAY APPARATUS USING SAME

TECHNICAL FIELD

The present invention relates to a surface light source apparatus for irradiation using a point light source, and also to a display apparatus using the same.

BACKGROUND ART

In a conventional surface light source apparatus, as disclosed in Patent Document 1, a hole is formed in a light guide plate, and an LED is arranged in the middle of the hole. This configuration enables a light of the LED to be efficiently incident on the light guide plate, thus improving the brightness of a display surface.

PRIOR-ART DOCUMENTS

Patent Documents

Patent Document 1: Japanese Patent Application Laid-Open No. 2004-355889

SUMMARY OF INVENTION

Problems to be Solved by the Invention

However, in a backlight unit and the surface light source apparatus disclosed in the Patent Document 1, it is necessary that an end of the light guide plate is formed into a V-like shape in order to totally reflect a light emitted from a point light source. This increases a distance from the point light source to the end of the light guide plate. Additionally, it is necessary to block a light by a reflector to prevent a high-brightness region resulting from the light emitted from the point light source exiting through an exit surface without propagating in the light guide plate. For these reasons, a problem arises that the size of a frame of the surface light source apparatus is increased.

An object of the present invention is to provide a surface light source apparatus offering an increased in-plane brightness uniformity and a high light utilization efficiency without increasing the size of a frame, and also to provide a display apparatus including the surface light source apparatus.

Means for Solving the Problems

A surface light source apparatus and a display apparatus according to the present invention include: a point light source; and a light guide plate having a hole formed near one side surface thereof, the hole being formed at a position where the point light source is to be arranged, wherein the one side surface of the light guide plate has, in a portion thereof near the hole, a prism having a saw-toothed shape in a cross-section thereof parallel to a front surface of the light guide plate.

A display apparatus according to the present invention includes: a point light source having a light emitting surface formed on one surface thereof; and a light guide plate having a hole formed near one side surface thereof, the hole being for storing the point light source, wherein the light emitting surface is arranged opposed to the one side surface, and a plurality of recesses having a recessed shape in a cross-section thereof parallel to a front surface of the light guide plate are formed in the one side surface, in order to cause a light emitted from the light emitting surface to be directed to the one side surface.

Effects of the Invention

The surface light source apparatus and the display apparatus according to the present invention include: a point light source; and a light guide plate having a hole formed near one side surface thereof, the hole being formed at a position where the point light source is to be arranged, wherein the one side surface of the light guide plate has, in a portion thereof near the hole, a prism having a saw-toothed shape in a cross-section thereof parallel to a front surface of the light guide plate. Thereby, a light having reached the one side surface can be refracted by the prism. Thus, the uniformity of the in-plane brightness and the light utilization efficiency can be increased without increasing the size of a frame.

The surface light source apparatus and the display apparatus according to the present invention includes: a point light source having a light emitting surface formed on one surface thereof; and a light guide plate having a hole formed near one side surface thereof, the hole being for storing the point light source, wherein the light emitting surface is arranged opposed to the one side surface in order to cause a light emitted from the light emitting surface to be directed to the one side surface, and the one side surface has formed therein a plurality of recesses each having a recessed shape in a cross-section thereof parallel to a front surface of the light guide plate. This can prevent a high-brightness light resulting from the light emitted from the point light source exiting through an exit surface without propagating in the light guide plate. Thus, the light having reached one side surface can be refracted by the recesses. Therefore, the uniformity of the in-plane brightness and the light utilization efficiency can be increased without increasing the size of a frame.

These and other objects, features, aspects and advantages of the present invention will become more apparent from the following detailed description when taken in conjunction with the accompanying drawings.

BRIEF DESCRIPTION OF THE DRAWINGS

FIG. 1 An exploded perspective view of a surface light source apparatus according to an embodiment 1.

FIG. 5 A cross-sectional view of a surface light source apparatus according to the embodiment 1.

FIG. 7 A front elevational view of a surface light source apparatus according to an embodiment 3.

EMBODIMENT FOR CARRYING OUT THE INVENTION

A. Embodiment 1

Figure 2:
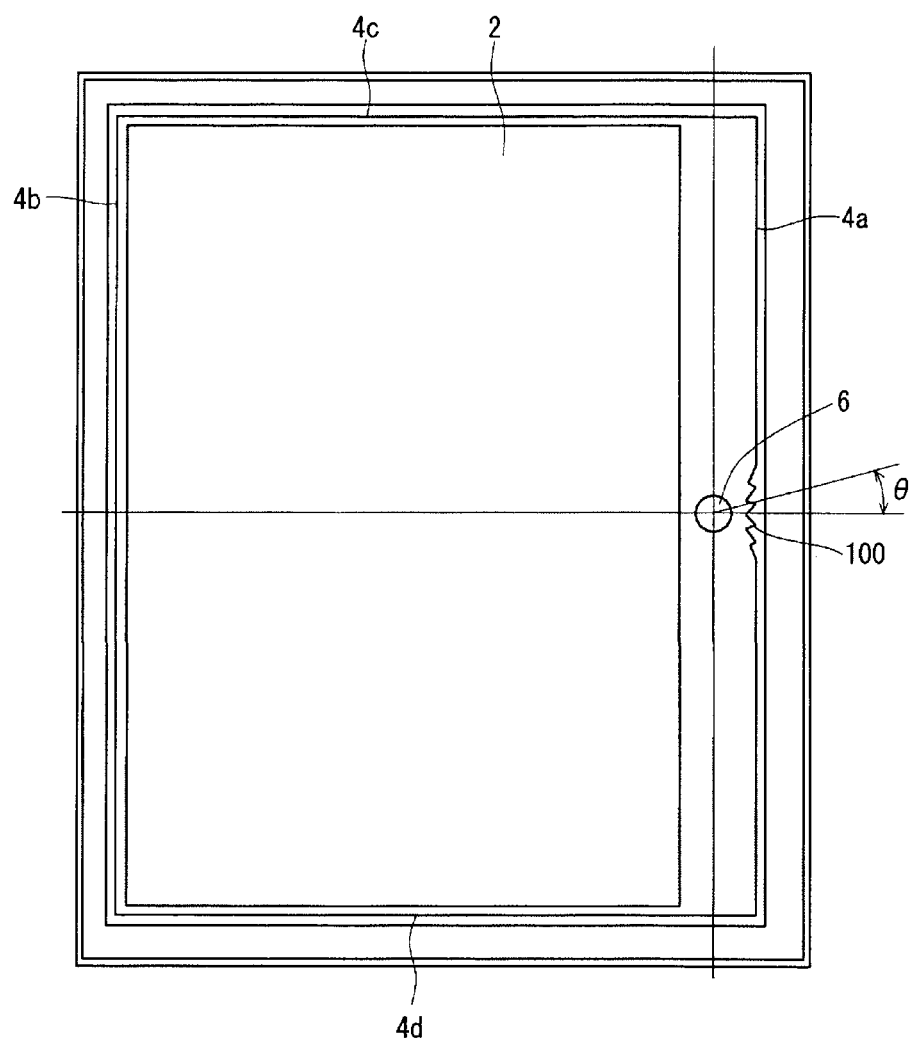
FIG. 2 A front elevational view of the surface light source apparatus according to the embodiment 1.

<A-1. Configuration of Surface Light Source Apparatus>

A configuration of a surface light source apparatus according to the present invention will be described with reference to the drawings. In the drawings, the same reference numerals are used for substantially the same elements.

FIG. 1 is an exploded perspective view showing component parts of a surface light source apparatus, and FIG. 2 shows the entire surface light source apparatus as seen from an exit surface (front surface) side that is located in an exit direction.

As shown in FIGS. 1 and 2, the surface light source apparatus of an embodiment 1 includes a light guide plate 4 for guiding a light in a planar manner and outputting the light from the exit surface. The light guide plate 4 is arranged within a housing 10 having an opening 2. The light guide plate 4 causes the light to propagate so as to output the light toward a direction (exit direction) where a surface having the opening 2 formed therein is located. An LED substrate 8 and a point light source 7 are arranged in a storage part formed at a bottom surface of the housing 10 that is opposed to the surface of the housing 10 having the opening 2 formed therein.

As shown in FIG. 1, optical sheets 3 are arranged at the exit surface side of the light guide plate 4. Reflective sheets 5 for reflecting a light are provided on an opposite-to-exit surface, a first side surface 4a (see FIG. 2), a second side surface 4b (see FIG. 2), a third side surface 4c, and a fourth side surface 4d (see FIG. 2). The opposite-to-exit surface is a surface of the light guide plate 4 opposite to the exit surface. The first side surface 4a (see FIG. 2) is a side surface relative to the exit surface, and positioned near the point light source 7. The second side surface 4b (see FIG. 2) is opposed to the first side surface 4a. The third side surface 4c and the fourth side surface 4d (see FIG. 2) are perpendicular to the first side surface 4a. Thus, in the surface light source apparatus according to the embodiment 1, the reflective sheets 5 are arranged on the opposite-to-exit surface of the light guide plate 4 and the respective side surfaces of the light guide plate 4, in order that a light can efficiently exit from the exit surface of the light guide plate 4. The reflective sheet 5 is made of a material obtained by mixing barium sulfate or titanium oxide with PP or PET, a material obtained by forming fine air bubbles in a resin, a material obtained by vapor-depositing silver on a metal plate, or a material obtained by applying a coating material containing titanium oxide to a metal plate. It is preferable that a reflectance of the reflective sheet 5 is 90% or more, in order to suppress a reflection loss on a reflecting surface. Stacking a plurality of reflective sheets 5 can improve the reflectance, and can improve a brightness on the exit surface of the surface light source apparatus.

It is preferable that the interior of the housing 10 is colored with white or the like, because this increases the reflectance and therefore the reflectance of the interior is further improved so that a light loss is reduced and thus a light utilization efficiency is improved. This is also preferable because omission of the reflective sheets 5 is allowed so that the number of parts is reduced and therefore costs can be lowered.

The optical sheet 3 arranged on the light guide plate 4 has a structure (not shown) of a lens sheet being sandwiched between diffusing sheets. In a case where it is necessary to improve the brightness, a plurality of lens sheets having an optimal combination of prism directions are adopted. Additionally, in order to improve diffusing properties of the diffusing sheet, two or more diffusing sheets may be used. Depending on light distribution characteristics of the lens sheet, only one diffusing sheet may be used, or no diffusing sheet may be used. Moreover, a protective sheet or a polarization-reflective sheet may be used in combination with the optical sheet 3. The configuration of the optical sheet 3 can be appropriately considered in view of the required level of the brightness, the light distribution characteristics, and the like.

As the point light source 7, a point light source such as a light emitting diode (hereinafter referred to as LED) or a laser diode (hereinafter referred to as LD) is used. In the embodiment 1, an LED light source having an LED mounted on a light source substrate is used as the point light source 7. Examples of the LED include a semiconductor light emitting element that emits a single-color light of blue or the like, and a pseudo-white LED made of a phosphor that absorbs a part of a blue light emitted from the semiconductor light emitting element and emits a yellow light. There may be also mentioned an LED including RED (red color), GREEN (green color), and BLUE (blue color) semiconductor light emitting elements and emitting a white light by combining three single-color lights. In this embodiment, the pseudo-white LED is used.

The LED substrate 8 adopted in the embodiment 1 holds the point light source 7, and a circuit pattern for supplying power to the point light source 7 is formed thereon. Mounting the LED substrate 8 that is a metal core (hereinafter referred to as MC) substrate enables heat generated in the point light source 7 to be efficiently transferred to the surroundings thereof. If an FPC (Flexible Printing Circuit) having a small thickness is mounted as the LED substrate 8, the heat generated in the point light source 7 can be transferred to the surroundings thereof in a further efficient manner, and additionally the size of the outer shape of the surface light source apparatus can be reduced.

A display element (not shown) is arranged on the surface light source apparatus having the above-described configuration. A liquid crystal display panel having applied thereto birefringence of a liquid crystal, a display panel having a transparent plate with characters or pictures printed thereon, or the like, is used as the display element. In the embodiment 1, a liquid crystal display panel is used as the display element.

In the liquid crystal display panel, a color filter substrate and a thin film transistor (hereinafter referred to as TFT) substrate are arranged opposed to each other. The color filter substrate has a color filter, a light blocking layer, opposed electrodes, and the like, formed on a substrate. The TFT substrate has a thin film transistor serving as a switching element, a pixel electrode, and the like, formed on a substrate. Additionally, there are provided a spacer for maintaining a space between these substrates and a sealing material for bonding the color filter substrate and the TFT substrate to each other. A liquid crystal is interposed between the color filter substrate and the TFT substrate. A sealant, an orientation film, and a polarizing plate are also provided (all not shown). The sealant is provided at an inlet port through which the liquid crystal is injected. The orientation film aligns the liquid crystal. The liquid crystal display panel changes a light distribution in a liquid crystal layer by turning on or off a voltage by using the switching element (not shown), and modulates a light incident on the liquid crystal display panel in accordance with a video signal, to thereby display the light in red color (R), green color (G), or blue color (B).

<A-1-1. Configuration of Light Guide Plate 4>

As shown in FIG. 2, the light guide plate 4 is in the form of a flat plate having a rectangular shape in a plan view. The light guide plate 4 includes the exit surface, the opposite-to-exit surface that is opposed to the exit surface, the first side surface 4a that is one of the side surfaces perpendicular to the opposite-to-exit surface and near the point light source 7, the second side surface 4b that is opposed to and paired with the first side surface 4a, and the third side surface 4c and the fourth side surface 4d that are opposed to each other and perpendicular to the first side surface 4a.

The light guide plate 4 is formed of a transparent acrylic resin, a polycarbonate resin, a glass, or the like. In the opposite-to-exit surface of the light guide plate 4, a light scattering part (not shown) is formed for disturbing a light propagation direction to thereby guide the light to the exit surface. The light scattering part functions as means for reflecting the light to the interior of the light guide plate 4. For the reflection means, there may be adopted, for example, a method of printing dots on the opposite-to-exit surface, a method of roughening the opposite-to-exit surface to form an embossed surface, and a method for forming fine spherical surfaces or unevenness.

The light scattering part may be provided in the exit surface of the light guide plate 4. Roughening the exit surface to form an embossed surface, a fine spherical surface, or unevenness provides the same effects as the effects of providing the reflection means in the opposite-to-exit surface of the light guide plate 4. That is, when a light reaches the exit surface of the light guide plate 4, the light scattering part of the exit surface scatters the light propagation direction. As a result, a part of the light incident on the exit surface is reflected toward the interior of the light guide plate 4, while the rest of the light exits through the exit surface to the outside of the light guide plate 4. Therefore, even if the reflection means is formed only in the exit surface of the light guide plate 4 and no reflection means is not provided in the opposite-to-exit surface, a reflection function similar to the function a dot pattern formed in the opposite-to-exit surface can be provided.

In the light guide plate 4, a hole 6 is provided at a position where the point light source 7 is to be arranged. In the embodiment 1, the hole 6 encloses the point light source 7, and extends through the light guide plate 4 between the opposite-to-exit surface (back surface) that is a bottom surface of the light guide plate 4 and the exit surface (front surface). Any shape may be selected as the cross-sectional shape of the hole 6, such as a circular shape, a rectangular shape, an oval shape, a slotted-hole shape, or a hexagonal shape. In the embodiment 1, a hole having a circular cross-sectional shape is adopted. The hole 6 is positioned between the first side surface 4a of the light guide plate 4 and an end of the opening 2 of the housing 10 near the first side surface 4a. This is desirable because direct light leakage to the exit surface through the hole 6 can be suppressed and thus unevenness of the brightness is reduced. It is also desirable that a mirror surface having no unevenness and therefore can prevent scattering is adopted as an inner peripheral surface of the hole 6.

Moreover, a reflecting part (not shown) is provided at least in a portion of the light guide plate 4 at the exit surface side corresponding to the position of the hole 6, and thereby a light emitted directly upward from the point light source 7 is reflected, which can improve the light utilization efficiency.

In a case where the hole 6 is not formed through the light guide plate 4 so as to extend from the opposite-to-exit surface to the exit surface but is formed up to a predetermined depth within the light guide plate 4 from the opposite-to-exit surface of the light guide plate 4, it is preferable that a reflecting plate (not shown) is provided in a portion at the exit surface side of the hole 6 corresponding to a position directly above the point light source 7, because a light emitted from the point light source 7 can be blocked from directly reaching the opening 2 of the housing 10 by means of a reflecting plate having a smaller area as compared with a reflecting part is provided on the exit surface of the light guide plate. Additionally, as shown in FIG. 5, it may be acceptable that a hole having a predetermined depth is formed at the opposite-to-exit surface side of the light guide plate 4 such that a bottom surface of the hole can form a protrusion 6b serving as a second protrusion, so that the point light source 7 is stored therein. Here, the protrusion 6b has a shape protruding toward the opposite-to-exit surface side. In FIG. 5, the upward direction of the drawing is the light exit direction, and a conical recess 6a having a shape with two different apex angles is formed in a portion of the light guide plate 4 at the exit surface side opposed to the hole having the protrusion 6b formed on the bottom surface thereof. Even in a case of using a light source (such as a perfect diffusion light source) having a no special light distribution as shown in FIG. 5, a light emitted from the light source is allowed to be efficiently incident on the light guide plate, and thus a surface brightness can be furthermore increased.

In the embodiment 1, the light guide plate 4 having an elongated rectangular shape is adopted as an example of the light guide plate 4 having a rectangular shape in a plan view. However, the present invention is not limited thereto, and the light guide plate 4 may have a wedge shape in which a plate thickness thereof decreases at a position more distant from the point light source 7 (not shown). Forming the light guide plate 4 into a wedge shape enables a propagating light to be efficiently guided to the exit surface. Since the amount of reflected light reflected by the reflective sheets 5 provided on the side surfaces of the light guide plate 4 is reduced, a reflection loss occurring in the reflective sheets 5 of the side surface can be reduced, which leads to an increase in the amount of exit from the exit surface.

<A-1-2. Configuration of Prism 100>

Figure 3:
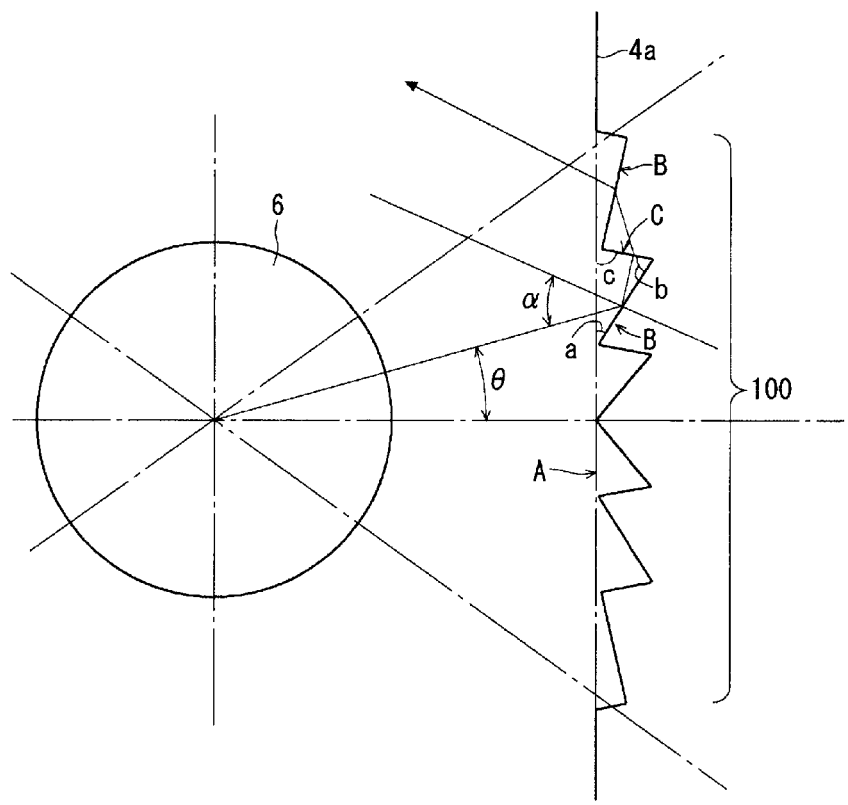
FIG. 3 A front elevational view of a main part of the surface light source apparatus according to the embodiment 1.

FIG. 3 is an enlarged view of a main part of the first side surface 4a of the light guide plate 4. FIG. 3 shows a cross-sectional shape, parallel to the front surface, of the light guide plate 4. In FIG. 3, the light guide plate 4 is shown in a left part, and an air space is shown in a right part. In the first side surface 4a of the light guide plate 4 serving as a boundary between them, a prism 100 (saw-toothed unevenness shape) is formed. As shown in FIG. 3, the prism 100 is formed near the hole 6 of the first side surface 4a. Here, the light exit direction is a direction toward the paper surface of the drawing, which is the same as that in FIG. 2. The prism 100 formed in the first side surface 4a has ridge lines extending in parallel with a direction connecting the exit surface and the opposite-to-exit surface of the light guide plate 4 to each other.

In the cross-sectional shape parallel to the exit surface shown in FIG. 3: an apex angle of a saw-toothed shape of the first side surface 4a is defined as an angle b (an apex-angle portion of the ridge line of the saw-toothed shape); an angle formed between a plane (side A) of the first side surface 4a and a side B extending from a trough of the saw-toothed shape to a vertex of a saw-toothed shape located farther from the point light source 7 is defined as an angle a; and an angle formed between the side A and a side C extending from a trough of the saw-toothed shape to a vertex of the saw-toothed shape at the side closer to the point light source 7 is defined as an angle c. Here, the side A is a side connecting troughs of the saw-toothed shape.

The angle c is preferably the right angle, and more preferably about 80° from the viewpoint of the moldability and the detachability during the manufacture of the light guide plate 4. Moreover, it is preferable that the pitch of the unevenness shape is 0.1 mm or more and 0.5 mm or less, from the viewpoint of the moldability and the detachability of the light guide plate 4 and in order to prevent an increase in the size of the light guide plate 4.

Referring to FIG. 3, an angle formed between a line that represents a light directed from the point light source 7 to the first side surface 4a being incident on an incident point on the side B and a line that represents a light directed from the point light source 7 perpendicularly to the first side surface 4a, in other words, an incident angle of incidence on the first side surface 4a, is defined as an angle θ. The same definition applies also to the lower side of the point light source 7 in FIG. 3. That is, the definition applies symmetrically with respect to the up-and-down direction in FIG. 3.

In the surface light source apparatus according to the embodiment 1, the angle a is formed so as to satisfy the relationship of [angle a≈angle α−angle θ]. Here, the angle α means an incident angle of the light from the point light source 7 being incident on a slope corresponding to the side B. The angle α is set so as to satisfy [angle α>sin−1(1/n)] where n represents a refractive index of the light guide plate 4, in order that the light having reached the slope corresponding to the side B can be totally reflected. Combined with the above-mentioned relational expression, the relationship can be expressed as [angle a+angle θ>sin−1(1/n)]. Setting the angle a relative to the angle θ in the above-described manner allows a slope angle a of the side B to decrease at a position more distant from the point light source 7, and additionally allows the angle a to be determined so as to make the angle of the light incidence on the side B uniform irrespective of which position on the prism 100 the incident point is located at.

In a case where acrylic having a refractive index n=1.49 is used as a material of the light guide plate 4, it is found that the angle α needs to be greater than 42.16°, based on the above expression. In the embodiment 1, the angle α is set to be 45°±2°, in order to obtain sufficient reflection characteristics.

A region where the prism 100 is formed is in such a range of a first side surface 4a that satisfies [θ≤±sin−1(1/n)], in a case where the refractive index of the light guide plate 4 is n. This is because, out of this range, the angle a is 0° and a total reflection occurs, and therefore it is not necessary to form the prism 100.

<A-2. Operation>

Next, an operation of the surface light source apparatus will be described with reference to FIG. 3. In the surface light source apparatus, the light emitted from the point light source 7 is diffused through the light guide plate 4 to form a uniform light distribution in the exit surface of the light guide plate 4, and the light is emitted from the opening 2 provided in the housing 10, to thereby display an image or the like by using a display element (not shown) arranged thereon. Hereinafter, a description will be given particularly to a light path in case where the prism 100 is formed on the above-described first side surface 4a of the light guide plate 4.

A light emitted from a light-emitting portion of the point light source 7 is incident on the light guide plate 4 from an inner surface of the hole 6 of the light guide plate 4. Among the incident light, a light having reached the first side surface 4a is incident on the side B of the saw-toothed shape of the prism 100 formed on the first side surface 4a, with the incident angle α.

The embodiment 1 considers a case where acrylic having a refractive index of 1.49 is used as the material of the light guide plate 4. The light incident with an incident angle α (45°±2°) is totally reflected at the side B. The totally-reflected light exits into the air space while being refracted at the side C, and is incident on a side B of a peak of the saw-toothed shape located farther from the point light source 7. The incident light is refracted at the side B, and propagates in the light guide plate 4 again.

Therefore, the light incident on the prism 100 is refracted toward the center of the light guide plate 4, and the light having reached the side surface having no prism 100 is, for example, totally reflected at the boundary between the light guide plate 4 and the air space existing around the light guide plate 4 and then propagates without leakage from the light guide plate 4.

When the light propagating in the light guide plate 4 reaches a dot print (not shown) applied to the opposite-to-exit surface of the light guide plate 4, the light is diffuse-reflected so that the light propagation direction is changed. As a result of this change in propagation, conditions of a critical angle are no longer satisfied at the boundary between the light guide plate 4 and the air space surrounding the light guide plate 4. Thus, the light exits from the exit surface of the light guide plate 4.

Figure 4:
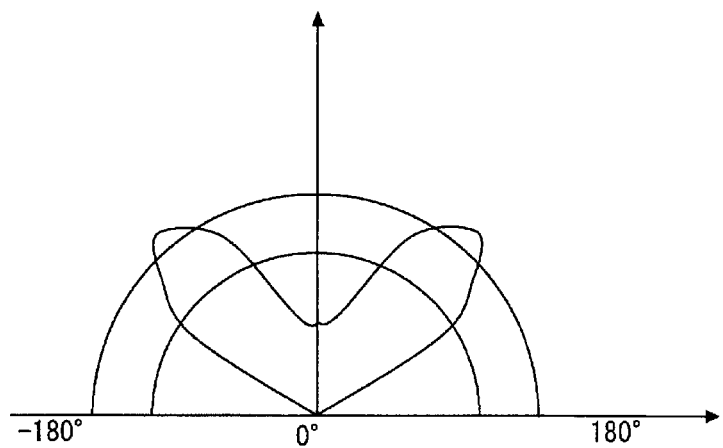
FIG. 4 A diagram showing a light distribution of a light source of the surface light source apparatus according to the embodiment 1.

As shown in FIG. 4, the point light source 7 of the embodiment 1 has a light distribution in which a light intensity takes the maximum value when the angle of the exit light is ±80°, where the clockwise direction in turning around a central axis from the vertical direction is defined as a positive direction. In a case of using such a point light source 7, among light incident angles of incidence on the inner surface of the hole 6 of the light guide plate 4, the light incident angle that provides the maximum light intensity is the incident angle 10°. Accordingly, most of the light emitted from the point light source 7 is substantially perpendicularly incident on the inner surface of the hole 6 of the light guide plate 4, without being reflected by the inner surface of the hole 6. Thus, the amount of light reflected to the reflecting plate provided at the exit surface side of the hole 6 can be reduced. Therefore, the incidence occurs efficiently.

<A-3. Effects>

In the embodiment 1 according to the present invention, the surface light source apparatus includes the point light source 7, and the light guide plate 4 having a rectangular shape in a plan view and having the hole 6 for storing the point light source 7 formed near the first side surface 4a that is one side surface. The first side surface 4a of the light guide plate 4 has, in a portion thereof near the hole 6, the prism 100 having a saw-toothed shape in its cross-section parallel to the front surface of the light guide plate 4. This enables the light having reached the first side surface 4a to be refracted by the prism 100 and propagate in the light guide plate 4 again without increasing the size of a frame. Therefore, a light exiting the first side surface 4a and reflected by the adjacent reflective sheet 5 can be considerably suppressed, and the uniformity of the in-plane brightness and the light utilization efficiency can be increased.

Additionally, the light emitted from the point light source 7 and reflected at the first side surface 4a is, at the prism 100, reflected in a direction away from the hole 6 of the light guide plate 4. This can reduce occurrence of a situation where the light reflected at the first side surface 4a is incident on the hole 6 of the light guide plate 4 and then scattered-reflected to exit again through the vicinity of the hole 6 of the light guide plate 4. Thus, the brightness is improved, and moreover the unevenness of the brightness can be reduced.

In the embodiment 1 according to the present invention, in the surface light source apparatus, the prism 100 is configured such that the slope angle of the slope extending from the trough of the saw-toothed shape to the peak of the saw-toothed shape located farther from the point light source 7 can be smaller than the slope angle of the slope extending from the trough of the saw-toothed shape to the peak of the saw-toothed shape located closer to the point light source 7. This can reduce the amount of light incident on the side C from the point light source 7. Thus, a light propagation efficiency can be increased.

In the embodiment 1 according to the present invention, in the surface light source apparatus, the prism 100 is configured such that the angle a that is a slope angle of the side B corresponding to the slope extending from the trough of the saw-toothed shape to the peak of the saw-toothed shape located farther from the point light source 7 can decrease at a position more distant from the point light source 7. This enables the light incident angle $\alpha$ of incidence on the side B to be kept uniform, and thus ensuring that the light totally reflected at the side B is refracted at the saw-toothed shape, to thereby efficiently collect the light to the light guide plate 4.

In the embodiment 1 according to the present invention, in the surface light source apparatus, the prism 100 is configured such that the angle c that is a slope angle of the side C corresponding to the slope extending from the trough of the saw-toothed shape to the peak of the saw-toothed shape located closer to the point light source 7 can be approximately 80°. This reduces the amount of light exiting the first side surface 4a into the air space, and therefore the brightness can be efficiently improved.

In the embodiment 1 according to the present invention, in the surface light source apparatus, the prism 100 is formed in such a range of the first side surface 4a that satisfies [$\theta \le \pm \sin^{-1}(1/n)$], where $\theta$ represents the incident angle of the light emitted from the point light source 7 being incident on the first side surface 4a that is one side surface of the light guide plate 4, and n represents the refractive index of the light guide plate 4. Thereby, the amount of light exiting the first side surface 4a into the air space is reduced, and additionally, out of the range where the prism 100 is formed, the light emitted from the point light source 7 is totally reflected at the first side surface 4a. Therefore, the brightness can be efficiently improved.

In the embodiment 1 according to the present invention, in the surface light source apparatus, the prism 100 satisfies [$a+\theta > \sin^{-1}(1/n)$], where $\theta$ represents the incident angle of the light emitted from the point light source 7 being incident on the first side surface 4a of the light guide plate 4, n represents the refractive index of the light guide plate 4, and a represents the slope angle of the slope extending from the trough of the saw-toothed shape to the peak of the saw-toothed shape located farther from the point light source 7. Thereby, the light totally reflected at the side B is refracted at the saw-toothed shape, to thereby efficiently collect the light to the light guide plate 4.

In the embodiment 1 according to the present invention, in the surface light source apparatus, the hole 6 is a hole formed through the light guide plate 4 so as to extend from the front surface to the back surface. Thereby, a space for arrangement of the point light source 7 can be defined. This enables the light emitted from the point light source 7 to be efficiently incident on the light guide plate 4, and thus the light propagation efficiency can be increased.

In the embodiment 1 according to the present invention, in the surface light source apparatus: the hole 6 is formed in the light guide plate 4 so as to extend from the back surface of the light guide plate 4 to a predetermined depth; and the protrusion 6b serving as the second protrusion is provided at the bottom surface of the hole 6 at the predetermined depth; and furthermore the conical recess 6a is provided in the portion of the front surface of the light guide plate 4 opposed to the hole 6. This enables the light emitted from the point light source 7 to be efficiently incident on the light guide plate 4, and thus the light propagation efficiency can be increased.

In the embodiment 1 according to the present invention, a display apparatus includes the surface light source apparatus described above. Since the light having reached the side surface of the light guide plate 4 can be refracted by the prism 100, the uniformity of the in-plane brightness and the light utilization efficiency can be increased without increasing the size of the frame.

B. Embodiment 2

<B-1. Configuration>

Hereinafter, a configuration of a surface light source apparatus according to an embodiment 2 will be described. The configuration is similar to that of the embodiment 1, except portions related to the cross-sectional shape of the hole 6 of the light guide plate 4 and the saw-toothed shape of the first side surface 4a. Therefore, the similar portions will not be described in detail. Similarly to the embodiment 1, the case where the hole 6 is formed through the light guide plate 4 so as to extend from the front surface to the back surface, and the case where the hole 6 is formed so as to extend from the back surface to a predetermined depth and the conical recess 6a is provided in the portion of the front surface of the light guide plate 4 opposed to the hole 6 (see FIG. 5) are applicable to the embodiment 2, too.

Figure 6:
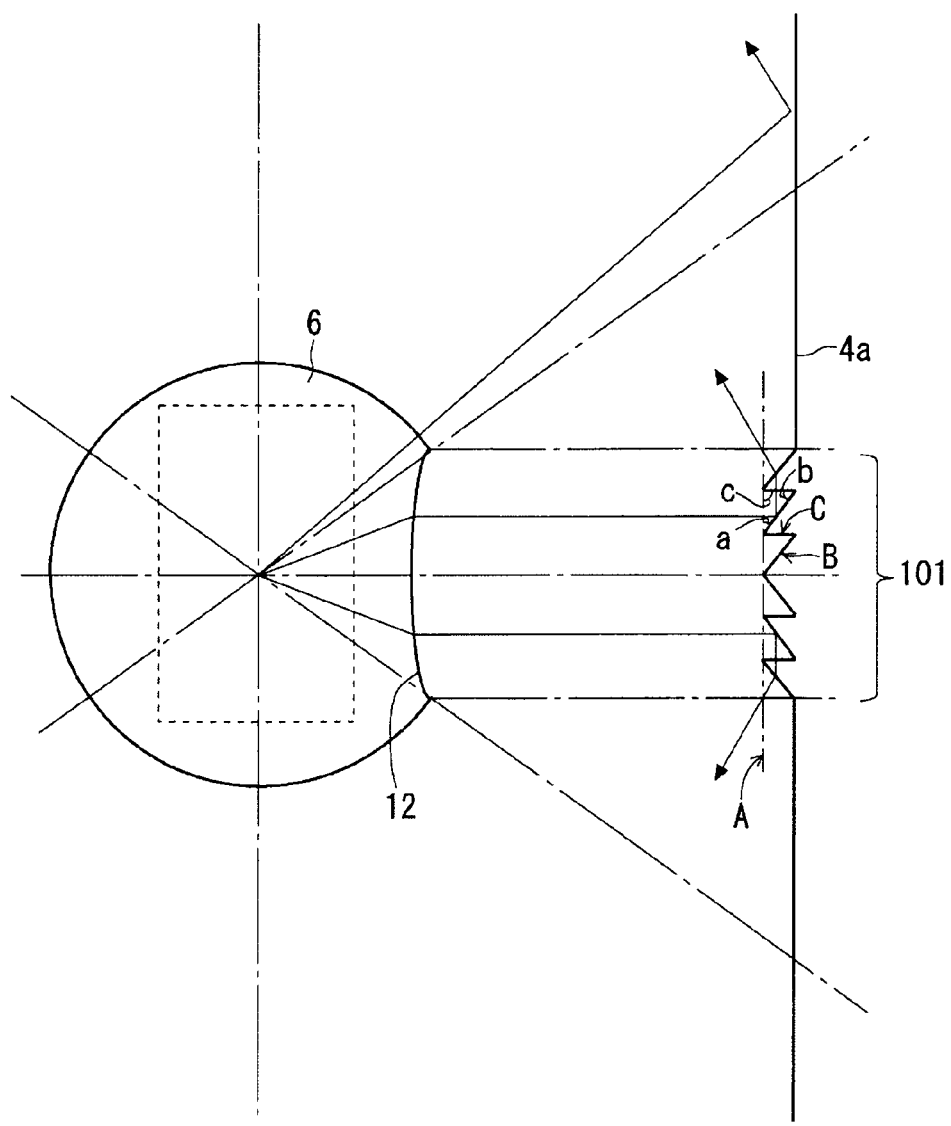
FIG. 6 A front elevational view of a main part of a surface light source apparatus according to an embodiment 2.

FIG. 6 is a front elevational view of the surface light source apparatus according to the embodiment 2. In addition to functions and effects unique to the surface light source apparatus according to the embodiment 2 which will be described below, the same functions and effects as those of the surface light source apparatus according to the embodiment 1 are provided.

<B-1-1. Configuration of Hole 6>

In the embodiment 1, the hole 6 of the light guide plate 4 has a circular shape in its cross-section parallel to the exit surface. In the embodiment 2, a shape as shown in FIG. 6 is obtained. Referring to FIG. 6, a protrusion 12 that is a first protrusion is formed at the inner surface of the hole 6 of the light guide plate 4, in other words, at a wall surface of the light guide plate 4 defining a side surface of the hole 6, within a range where an angle (incident angle $\theta$) formed between a line extending from the point light source 7 perpendicularly to the first side surface 4a and a line extending from the point light source 7 to a light incident point can be −45° to +45°. As a result, the cross-sectional shape of the hole 6 is deformed as shown in FIG. 6. Here, the range where the protrusion 12 of the embodiment 2 is formed is set to be −45°≤$\theta$≤45°, because such a range can satisfy [$\theta \le \pm \sin^{-1}(1/n)$] in a case where acrylic having the refractive index n=1.49 is used as the material of the light guide plate 4.

The protrusion 12, which is a convex lens having its thickness increased at a central portion thereof, protrudes at the inner surface of the hole 6 toward the point light source 7 side, that is, toward the center of the hole 6, and has its focal point positioned at the center of light emission of the point light source 7. However, if the focal point of the protrusion 12 is set to be the center of the light emission of the point light source 7, the thickness of the protrusion 12 is increased so that a connecting portion connecting the protrusion 12 to the circular hole 6 of the light guide plate 4 form an acute angle, which makes a molding process difficult. Accordingly, the focal point of the protrusion 12 is positioned at a side of the center of light emission of the point light source 7 closer to the second side surface 4b that is another side surface opposed to the first side surface 4a. Thereby, the thickness of the protrusion 12 can be reduced and additionally the connecting portion connecting the protrusion 12 to the inner surface of the hole 6 can be prevented from forming an acute angle. Thus, the molding process can be made easy.

The protrusion 12 is formed into a hyperboloid shape in which a conic constant K of a curved surface of the protrusion 12 satisfies $-1 < K \leq 0$. If the protrusion 12 is defined by a part of a curved surface of a circle that satisfies conic constant $K=0$, the protrusion 12 can be formed with a smaller thickness.

Such a configuration allows a light incident on the protrusion 12 provided on the inner surface of the hole 6 of the light guide plate 4 to be refracted by the curved surface of the protrusion 12 in a direction perpendicular to the first side surface 4a of the light guide plate 4 and to be substantially perpendicularly incident on a prism 101 formed on the first side surface 4a.

In a case of the shape shown in FIG. 5, the similar protrusion 12 is formed on an inner surface of the recess 6a configured by two conical shapes such that the protrusion 12 satisfies $[\theta \leq \pm \sin^{-1}(1/n)]$. Even in a case of using a light source (such as a perfect diffusion light source) having a no special light distribution as shown in FIG. 6, a light is allowed to be efficiently incident on the light guide plate 4, and thus a surface brightness can be furthermore increased.

<B-1-2. Configuration of Prism 101>

FIG. 6 is an enlarged view (cross-sectional view) of a main part of the first side surface 4a of the light guide plate 4. In FIG. 6, the light guide plate 4 is shown in a left part, and an air space is shown in a right part. In the first side surface 4a of the light guide plate 4 serving as a boundary between them, a prism 101 (saw-toothed unevenness shape) is formed. Here, the light exit direction is a direction toward the paper surface of the drawing, which is the same as that in FIG. 2. The prism 101 formed in the first side surface 4a has ridge lines extending in parallel with a direction connecting the exit surface and the opposite-to-exit surface of the light guide plate 4 to each other.

In the cross-sectional shape parallel to the exit surface shown in FIG. 6: an apex angle of a saw-toothed shape of the first side surface 4a is defined as an angle b (an apex-angle portion of the ridge line of the saw-toothed shape); an angle formed between a side A and a side B extending from a trough of the saw-toothed shape to a vertex of a saw-toothed shape located farther from the point light source 7 is defined as an angle a; and an angle formed between the side A and a side C extending from a trough of the saw-toothed shape to a vertex of the saw-toothed shape at the side closer to the point light source 7 is defined as an angle c. Here, the side A is a side connecting troughs of the saw-toothed shape, and is different from the plane of the first side surface 4a, as shown in FIG. 6.

The angle c is preferably the right angle. Since the light incident on the first side surface 4a is refracted by the curved surface of the protrusion 12 in a substantially perpendicular direction (incident angle is approximately 0°), it is necessary to set the angle a so as to satisfy [angle $a > \sin^{-1}(1/n)$], in accordance with the relational expression of the embodiment 1. Therefore, in a case where acrylic having the refractive index $n=1.49$ is used as the material of the light guide plate 4, it is necessary to set the angle a greater than 42.16°. It is preferable to set the angle a to be 50° or more, in consideration of a case where the light emitted from the point light source 7 and traveling toward the first side surface 4a while being refracted by the protrusion 12 provided in the hole 6 of the light guide plate 4 is not sufficiently perpendicular to the first side surface 4a. Moreover, it is preferable that the pitch of the unevenness shape is 0.1 mm or more and 0.5 mm or less, from the viewpoint of the moldability and the detachability of the light guide plate 4 and in order to prevent an increase in the size of the light guide plate 4.

<B-2. Operation>

Next, an operation of the surface light source apparatus will be described. Similarly to the embodiment 1, the surface light source apparatus forms a uniform light distribution by using the light guide plate 4, and displays an image or the like by using a display element. Among these parts, particularly, a light path passing through the protrusion 12 provided in the hole 6 of the light guide plate 4 and the prism 101 formed on the first side surface 4a will be described.

FIG. 6 illustrates the protrusion 12 provided in the hole 6 of the light guide plate 4, and the saw-toothed shape of the first side surface 4a, and shows a light path of a light emitted from the point light source 7. The light emitted from the light-emitting portion of the point light source 7 is incident on the light guide plate 4 through the inner surface of the hole 6 of the light guide plate 4. Particularly, the light incident through the protrusion 12 provided in the hole 6 of the light guide plate 4 is refracted by the curved surface of the protrusion 12 in the direction substantially perpendicular to the first side surface 4a. This refracted light is incident with an incident angle a on the side B of the saw-toothed shape formed on the first side surface 4a.

The embodiment 2 considers a case where acrylic having a refractive index of 1.49 is used as the material of the light guide plate 4. The light incident with an incident angle α (which is desirably 50° or more) is totally reflected at the side B (reflected in a direction substantially parallel to the first side surface 4a). The totally-reflected light exits into the air space while being refracted at the side C, and is incident on a side B of a peak of the saw-toothed shape located farther from the point light source 7. The incident light is refracted, and propagates in the light guide plate 4 again.

Since the light incident on the prism 101 is refracted toward the center of the light guide plate 4, the light leakage to the air space from a portion of the first side surface 4a near the point light source 7 is reduced. Thus, occurrence of light reflection at the reflective sheet 5 is suppressed. As a result, the light utilization efficiency is improved.

<B-3. Effects>

In the embodiment 2 according to the present invention, in the surface light source apparatus, the wall surface of the light guide plate 4 that defines the side surface of the hole 6 has, in a portion thereof at the side close to the first side surface 4a that is one side surface, the protrusion 12 serving as the first protrusion and protruding toward the center of the hole 6. This causes the light refracted by the curved surface of the protrusion 12 to be substantially perpendicularly incident on the first side surface 4a. Therefore, the incident angle of incidence on the side B of the unevenness shape is made uniform irrespective of which position on the first side surface 4a the incidence occurs at. Thus, the shape of the prism 101 formed on the first side surface 4a can be simplified. This makes it easy to process a mold for the prism 101, and the molding can be performed at a lowered cost.

Moreover, since the protrusion 12 refracts the light in the direction perpendicular to the first side surface 4a, the amount of light incident on the side C of the unevenness shape of the prism 101 can be reduced, which enables efficient light reflection.

In the embodiment 2 according to the present invention, in the surface light source apparatus, the prism 101 is configured such that the angle c that is a slope angle of the side C corresponding to the slope extending from the trough of the saw-toothed shape to the peak of the saw-toothed shape located closer to the point light source 7 can be approximately 90°. This reduces the amount of light exiting the first side surface 4a into the air space, and therefore the brightness can be efficiently improved.

In the embodiment 2 according to the present invention, in the surface light source apparatus, the protrusion 12 is formed in such a range of the side surface of the hole 6 that satisfies [θ≤±sin−1(1/n)], where θ represents the incident angle of the light emitted from the point light source 7 being incident on the first side surface 4a of the light guide plate 4, and n represents the refractive index of the light guide plate 4. Thereby, the amount of light exiting the first side surface 4a into the air space is reduced, and additionally, the light exiting through a region out of the range where the protrusion 12 is formed is totally reflected at the first side surface 4a. Therefore, the brightness can be efficiently improved.

In the embodiment 2 according to the present invention, in the surface light source apparatus, the protrusion 12 is a convex lens having its focal point positioned at the center of light emission of the point light source 7. Thereby, the light emitted from the point light source 7 can be refracted in a direction allowing the light to be substantially perpendicularly incident on the first side surface 4a.

In the embodiment 2 according to the present invention, in the surface light source apparatus, the protrusion 12 is a convex lens having its focal point positioned at a side of the center of the light emission of the point light source 7 closer to the second side surface 4b of the light guide plate 4 that is opposed to the first side surface 4a. This can reduce the thickness of the protrusion 12, and can prevent the connecting portion connecting the protrusion 12 to the inner surface of the hole 6 form forming an acute angle.

In the embodiment 2 according to the present invention, in the surface light source apparatus, the conic constant K of the curved surface of the convex lens satisfies −1<K≤0. Thereby, the protrusion 12 can be formed with a smaller thickness.

In the embodiment 2 according to the present invention, in the surface light source apparatus, the conic constant K of the curved surface of the convex lens satisfies K=0. Thereby, the protrusion 12 can be formed with a smaller thickness.

<Modification>

The protrusion 12 formed in the hole 6 of the light guide plate 4 may be a prism (not shown). An angle of the prism can be appropriately adjusted such that a light emitted from the point light source 7 can be refracted by the prism in a direction perpendicular to the first side surface 4a.

C. Embodiment 3

<C-1. Configuration>

Hereinafter, a configuration of a surface light source apparatus according to an embodiment 3 will be described. Parts identical or equivalent to those of the embodiments 1 and 2 are given the same reference numerals, and description thereof will be omitted.

<C-1-1. Configuration of Point Light Source 7 (side view LED)>

Figure 8:
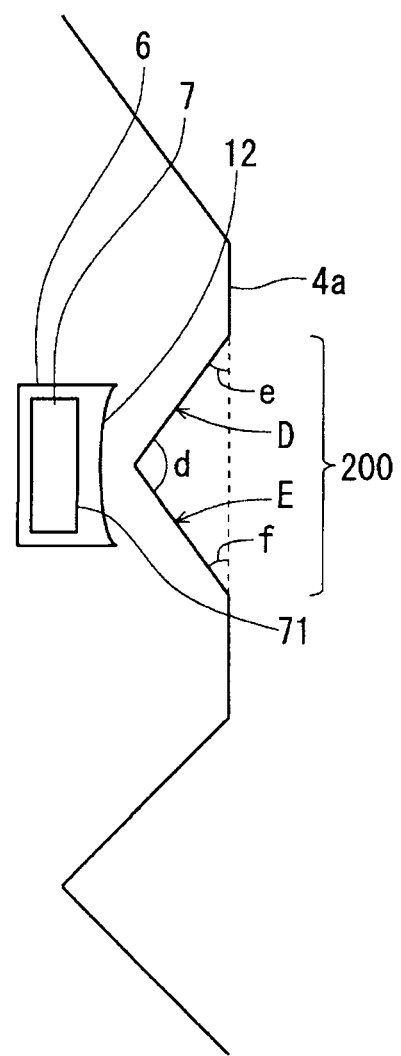
FIG. 8 A front elevational view of a main part of the surface light source apparatus according to the embodiment 3.
Figure 9:
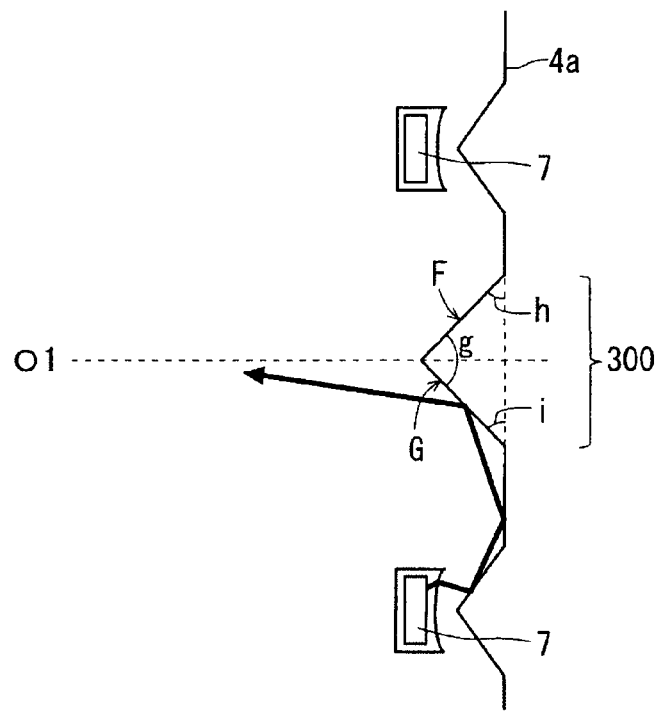
FIG. 9 A front elevational view of a main part of the surface light source apparatus according to the embodiment 3.
Figure 10:
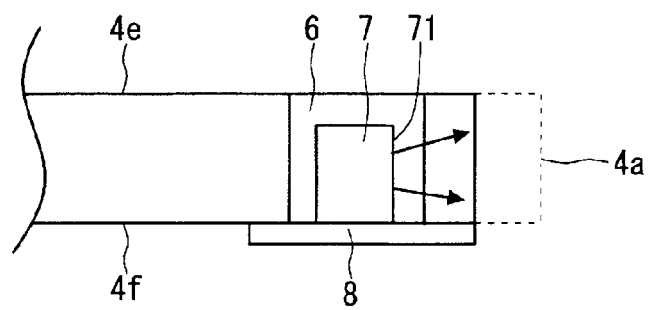
FIG. 10 A cross-sectional view of a main part of the surface light source apparatus according to the embodiment 3.

FIG. 7 is a front elevational view of a surface light source apparatus according to the embodiment 3. FIG. 8 is an enlarged view of a main part around the point light source 7 of FIG. 7. FIG. 9 is an enlarged view of a main part between the point light sources 7 of FIG. 7. FIG. 10 shows a cross-sectional as taken along the line A-A of FIG. 7.

As shown in FIG. 10, the point light source 7 adopted in the embodiment 3 has a substantially cubic shape, and a side view LED is used therefor having a light emitting surface 71 formed on one of its surfaces that are perpendicular to its surface opposed to an LED substrate 8 (a surface for electrical connection with the LED substrate 8). In this side view LED, no light emitting surface is provided on an exit surface and an opposite-to-exit surface, and a light does not exit to the exit surface and the opposite-to-exit surface.

The point light source 7 is arranged in the hole 6 of the light guide plate 4, and the light emitting surface 71 (see FIG. 8) is arranged opposed to the first side surface 4a of the light guide plate 4 such that a light emitted from the light emitting surface 71 can be directed to the first side surface 4a. Such an arrangement enables the light emitted from the point light source 7 to be incident and directed toward the first side surface 4a through, in the hole 6 of the light guide plate 4, a surface opposed to the first side surface 4a and closest to the first side surface 4a.

<C-1-2. Configuration of Light Guide Plate 4>

In the light guide plate 4 of the embodiment 3, V-shaped recesses are formed in the first side surface 4a. A shape of the first side surface 4a of the light guide plate 4 near the point light source 7 will be described with reference to FIG. 8.

In the embodiment 1, the prism 100 having a saw-toothed shape is formed in the portion of the first side surface 4a near the hole 6. In the embodiment 3, on the other hand, a first V-shaped portion 200 (see FIG. 8) and a second V-shaped portion 300 (see FIG. 9) both of which are recesses having V-like shapes in their cross-sections parallel to an exit surface 4e (see FIG. 10) are provided in a portion of the first side surface 4a near the hole 6 of the light guide plate 4.

The first V-shaped portion 200 formed in the first side surface 4a is configured as a V-shaped recess having a ridge line extending in parallel with a direction connecting the exit surface 4e and an opposite-to-exit surface 4f (see FIG. 10) of the light guide plate 4 to each other. As shown in FIG. 8, in the first V-shaped portion 200, an apex angle forming the V shape and closest to the point light source 7 is defined as an angle d, and sides extending from the angle d to the first side surface 4a are defined as a side D and a side E. An angle formed between the side D and an extended line of the first side surface 4a is defined as an angle e, and an angle formed between the side E and the extended line of the first side surface 4a is defined as an angle f. Here, it is desirable that the angle d is located on a straight line extending from the point light source 7 perpendicularly to the first side surface 4a. In a case where the angle d is set to be 90°, the light emitted from the point light source 7 can be totally reflected toward the third side surface 4c and the fourth side surface 4d in an efficient manner. If the angle e and the angle f are equal to each other so that a triangle having the angle d, the angle e, and the angle f is an isosceles triangle with the angle d being the apex angle, the light emitted from the point light source 7 can be directed uniformly to the third side surface 4c and the fourth side surface 4d. Although FIG. 8 illustrates the side D and the side E with straight lines, the side D and the side E may form curved lines in order to efficiently refract the light emitted from the point light source 7.

Next, the second V-shaped portion 300 formed in a portion of the light guide plate 4 between the plurality of point light sources 7 arranged will be described with reference to FIG. 9. The light guide plate 4 of the embodiment 3 includes the second V-shaped portion 300 that is a recess having a V-like shape in its cross-section parallel to the exit surface. The second V-shaped portion 300 is formed at a position on the first side surface 4a passing through a midpoint O1 of the neighboring point light sources 7. In the second V-shaped portion 300, the apex angle of the recess is defined as the angle g, and the sides extending from the angle g to the first side surface 4a are defined as the side F and side G. The angle formed between the side F and the extended line of the first side surface 4a is defined as the angle h, and the angle formed between the side G and the extended line of the first side surface 4a is defined as the angle i. By making the angle h and the angle i equal to each other, the unevenness of the brightness of the exit surface 4e is suppressed, and thus the display quality level can be ensured. It is desirable that the triangle having the angle g, the angle h, and the angle i is an isosceles triangle, in order that the light emitted from the light source can be distributed in a laterally symmetrical manner. The magnitudes of the angle g, the angle h, and the angle i can be set to be any value in consideration of the positions of the point light sources 7, the distance from the point light source 7 to the first side surface 4a, the distance between the point light sources 7, and the like.

As shown in FIG. 7, the wall surface of the light guide plate 4 that defines the side surface of the hole 6 has, in a portion thereof at the side close to the first side surface 4a that is one side surface, the protrusion 12 serving as the first protrusion and protruding toward the center of the hole 6. This causes the light refracted by the curved surface of the protrusion 12 to be substantially perpendicularly incident on the first side surface 4a. A chamfered portion 400 may be formed at a portion (corner portion) between the first side surface 4a and each of the third side surface 4c and the fourth side surface 4d.

<C-2. Operation>

The surface light source apparatus of the embodiment 3 adopts the point light source 7 that is, for example, a side view LED having the light emitting surface 71 (see FIG. 10) formed on one surface thereof. Therefore, the light emitted from the light emitting surface 71 is incident through the hole 6, and is directed to the first side surface 4a. In the hole 6, the light is incident on the light guide plate 4, through the inner surface of the protrusion 12 that is opposed to the first side surface 4a and closest to the first side surface 4a. The incident light is refracted by the protrusion 12 in the direction substantially perpendicular to the first side surface 4a. The refracted light reaches the first side surface 4a and, at the boundary with the air space, is totally reflected by the side D or the side E of the first V-shaped portion 200. Further, a part of the light is totally reflected by the first side surface 4a. Still further, a part of the light is totally reflected by the second V-shaped portion 300 formed between the point light sources 7 or by the chamfered portions 400 formed at the corner portions, and propagates toward the exit surface of the light guide plate 4. Then, the light propagates in the light guide plate 4 while being repeatedly totally reflected at the boundary between the light guide plate 4 and the air space surrounding the light guide plate 4. When the light propagating in the light guide plate 4 reaches the dot print (not shown) applied to the opposite-to-exit surface of the light guide plate 4, the light is diffuse-reflected so that the light propagation direction is changed. As a result of this change in propagation, a critical angle is no longer satisfied at the boundary between the light guide plate 4 and the air space surrounding the light guide plate 4. Thus, the light exits from the exit surface of the light guide plate 4.

<C-3. Effects>

As described above, in the surface light source apparatus of the embodiment 3, for example, a side view LED having the light emitting surface 71 formed on one surface thereof is adopted as the point light source 7, and the light emitting surface 71 is arranged opposed to the first side surface 4a. Thereby, the light emitted from the point light source 7 can be efficiently directed to the first side surface 4a and propagate in the light guide plate. This can prevent the light from exiting in the vicinity of the point light source 7. Thus, near the first side surface 4a, an end of the opening 2 of the housing 10 can be located closer to the position of the hole 6. Therefore, the unevenness of the brightness, that is, a region between the point light sources 7 being darkened, can be reduced, and the surface light source apparatus having a high in-plane brightness uniformity is achieved, without increasing the size of the frame.

Moreover, in this method, a thin and small LED, as exemplified by a side view LED, is used. Thus, the surface light source apparatus can be configured without increasing the thickness of the light guide plate.

The first side surface 4a has the first V-shaped portion 200 formed near the point light source 7, and the second V-shaped portion 300 formed between the point light sources 7. Thereby, the light emitted from the point light source 7 and having reached the first side surface 4a is totally reflected. This can cause the light emitted from the point light source 7 to efficiently propagate in the light guide plate 4, and thus the incident-light utilization efficiency can be improved.

The hole 6 has the protrusion 12 protruding toward the point light source 7 side, that is, toward the center of the hole 6. Thereby, the light emitted from the point light source 7 can exit substantially perpendicularly to the first side surface 4a. This can further ensure that the light is incident with an angle not greater than a total reflection angle on the side D and the side E that form the first V-shaped portion 200 of the light guide plate 4. Therefore, the amount of light exiting the light guide plate 4 through the side D and the side E is reduced, and thus the light utilization efficiency is improved.

Although the first V-shaped portion 200 and the second V-shaped portion 300 are formed in the first side surface 4a, a prism having a saw-toothed shape may be applied as described in the embodiment 1.

In the embodiment 3, in the surface light source apparatus, as shown in FIG. 10, the hole 6 is formed through the light guide plate 4 so as to extend from the opposite-to-exit surface 4f to the exit surface 4e. Thereby, a space for arrangement of the point light source 7 can be defined. This enables the light emitted from the point light source 7 to be efficiently incident on the light guide plate 4, and thus the light propagation efficiency can be increased. Additionally, an area of incidence of the light emitted from the point light source 7 being incident on the light guide plate 4 can be enlarged.

Figure 11:
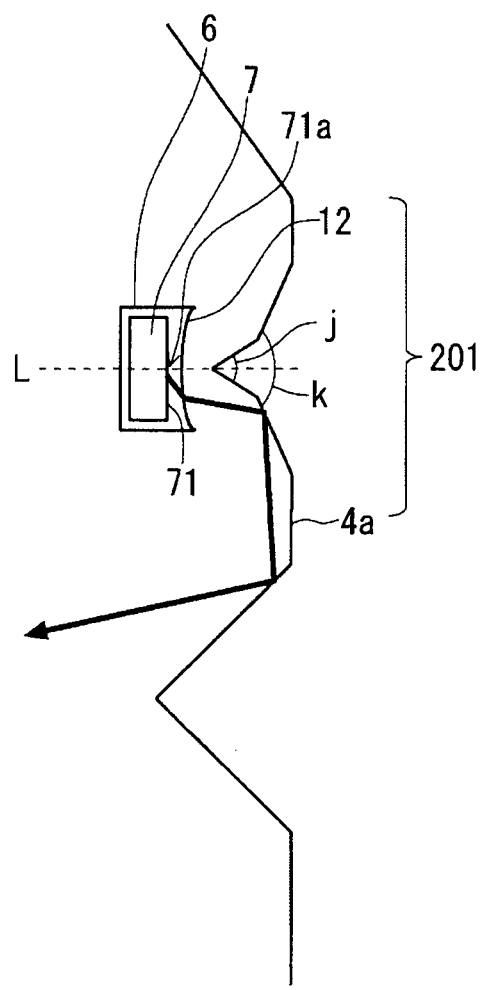
FIG. 11 A front elevational view of a main part of a surface light source apparatus according to a modification of the embodiment 3.

FIG. 11 shows a modification of the surface light source apparatus of the embodiment 3. As shown in FIG. 11, the V-shaped portion formed in the light guide plate 4 may be configured as a V-shaped portion 201 having different apex angles. The V-shaped portion 201 has an angle j formed at a position closer to the hole 6 and an angle k formed at a position farther from the hole 6. The angle j and the angle k different from each other are located on a line L extending from the hole 6 and perpendicular to the first side surface 4a. The angle j is set smaller than the angle k (angle j<angle k). Here, if the light emitting surface 71 of the point light source 7 has a large area, a light that exits the point light source 7 through a position distant from the center 71a of the light emission may reach the side surfaces D and E of the first V-shaped portion 200 of FIG. 8 without being refracted in a substantially perpendicular manner by the protrusion 12, which sometimes results in a situation where a light not satisfying total reflection conditions is not totally reflected and exits the light guide plate 4.

Therefore, as shown in this modification, the V-shaped portion 201 having different apex angles are formed, to thereby enables the light that exits the point light source 7 through a position distant from the center 71a of light emission to satisfy the total reflection conditions. Thus, the light can be directed so as to propagate in the light guide plate 4, without exiting the light guide plate 4 through the first side surface 4a side. As a result, the light emitted from the point light source can be totally reflected in an efficient manner, and thus the light utilization efficiency is improved.

In a display apparatus including the above-described surface light source apparatus, too, the uniformity of the in-plane brightness is improved to achieve a high light utilization efficiency, without increasing the size of the frame.

While the invention has been described in detail, the foregoing description is in all aspects illustrative and the present invention is not limited thereto. It will be appreciated that numerous modifications unillustrated herein can be made without departing from the scope of the present invention.

DESCRIPTION OF THE REFERENCE NUMERALS 2 opening; 3 optical sheet; 4 light guide plate; 4a first side surface; 4b second side surface; 4c third side surface; 4d fourth side surface; 4e exit surface; 4f opposite-to-exit surface; 5 reflective sheet; 6 hole; 6a recess; 6b, 12 protrusion; 7 point light source; 8 LED substrate; 10 housing; 71 light emitting surface; 71a center of light emission; 100, 101 prism; 200 first V-shaped portion; 300 second V-shaped portion; 400 chamfered portion; and 201 V-shaped portion having different apex angles

The invention claimed is:

1. A surface light source apparatus comprising:
a point light source; and
a light guide plate having a hole formed near one side surface thereof, said hole being formed at a position where said point light source is to be arranged, wherein
said one side surface of said light guide plate has, in a portion thereof near said hole, a prism having a saw-toothed shape in a cross-section thereof parallel to a front surface of said light guide plate;
a wall surface of the light guide plate that defines a side surface of the hole has a first protrusion protruding toward a center of the hole;
the first protrusion is disposed at a portion of the side surface of the hole that is closest to the one side surface;
said first protrusion is a convex lens having a focal point thereof positioned at a center of light emission of said point light source; and
a conic constant K of a curved surface of said convex lens satisfies $-1 < K \leq 0$.

2. The surface light source apparatus according to claim 1, wherein
said prism is configured such that a slope angle of a slope extending from a trough of said saw-toothed shape to a peak of said saw-toothed shape located farther from said point light source is smaller than a slope angle of a slope extending from the trough of said saw-toothed shape to a peak of said saw-toothed shape located closer to said point light source.

3. The surface light source apparatus according to claim 1, wherein
said prism is configured such that a slope angle of a slope extending from a trough of said saw-toothed shape to a peak of said saw-toothed shape located farther from said point light source decreases at a position more distant from said point light source.

4. The surface light source apparatus according to claim 1, wherein
said prism is configured such that a slope angle of a slope extending from a trough of said saw-toothed shape to a peak of said saw-toothed shape located closer to said point light source is substantially 80°.

5. The surface light source apparatus according to claim 1, wherein
said prism is formed in such a range of said one side surface that satisfies $[\theta \leq \pm \sin^{-1}(1/n)]$, where $\theta$ represents an incident angle of a light emitted from said point light source being incident on said one side surface of said light guide plate, and n represents a refractive index of said light guide plate.

6. The surface light source apparatus according to claim 1, wherein
said prism is configured such that a slope angle of a slope extending from a trough of said saw-toothed shape to a peak of said saw-toothed shape located closer to said point light source is substantially 90°.

7. The surface light source apparatus according to claim 1, wherein
said first protrusion is formed in such a range of the side surface of said hole that satisfies $[\theta \leq \pm \sin^{-1}(1/n)]$, where $\theta$ represents an incident angle of a light emitted from said point light source being incident on said one side surface of said light guide plate, and n represents a refractive index of said light guide plate.

8. The surface light source apparatus according to claim 1, wherein
said prism satisfies $[a+\theta > \sin^{-1}(1/n)]$, where $\theta$ represents an incident angle of a light emitted from said point light source being incident on said one side surface of said light guide plate, n represents a refractive index of said light guide plate, and a represents a slope angle of a slope extending from a trough of said saw-toothed shape to a peak of said saw-toothed shape located farther from said point light source.

9. The surface light source apparatus according to claim 1, wherein
said hole is a hole formed through said light guide plate so as to extend from the front surface to a back surface thereof.

10. The surface light source apparatus according to claim 1, wherein
said hole is formed so as to extend from a back surface of said light guide plate to a predetermined depth of said light guide plate, and a second protrusion is provided at a bottom surface of said hole at said predetermined depth, and
said light guide plate further has a conical recess formed in a portion of the front surface thereof opposed to said hole.

11. A display apparatus including the surface light source apparatus according to claim 1.

12. A surface light source apparatus comprising:
a point light source having a light emitting surface formed on one surface thereof; and
a light guide plate having a hole formed near one side surface thereof, said hole being for storing said point light source, wherein
said light emitting surface is arranged opposed to said one side surface in order to cause a light emitted from said light emitting surface to be directed to said one side surface, and said one side surface has formed therein a plurality of recesses each having a recessed shape in a cross-section thereof parallel to a front surface of said light guide plate,
a wall surface of the light guide plate that defines a side surface of the hole has a first protrusion protruding toward a center of the hole, the first protrusion is disposed at a portion of the side surface of the hole that is closest to the one side surface, said first protrusion is a convex lens having a focal point thereof positioned at a center of light emission of said point light source, and a conic constant K of a curved surface of said convex lens satisfies −1<K≤0.

13. The surface light source apparatus according to claim 12, wherein said point light source comprises a plurality of point light sources, and said recesses formed near said hole include a first recessed portion provided near said hole and a second recessed portion provided between said point light sources, said first recessed portion having a V-like shape in a cross-section thereof parallel to the front surface of said light guide plate, said second recessed portion having a V-like shape in a cross-section thereof parallel to the front surface of said light guide plate.

14. The surface light source apparatus according to claim 12, wherein said first protrusion is formed in such a range of the side surface of said hole that satisfies [θ≤±sin−1(1/n)], where θ represents an incident angle of a light emitted from said point light source being incident on said one side surface of said light guide plate, and n represents a refractive index of said light guide plate.

15. The surface light source apparatus according to claim 12, wherein said hole is a hole formed through said light guide plate so as to extend from the front surface to a back surface thereof.

16. A display apparatus including the surface light source apparatus according to claim 12.

17. A surface light source apparatus comprising:

a point light source; and a light guide plate having a hole formed near one side surface thereof, said hole being formed at a position where said point light source is to be arranged, wherein said one side surface of said light guide plate has, in a portion thereof near said hole, a prism having a saw-toothed shape in a cross-section thereof parallel to a front surface of said light guide plate;

a wall surface of the light guide plate that defines a side surface of the hole has a first protrusion protruding toward a center of the hole;

the first protrusion is disposed at a portion of the side surface of the hole that is closest to the one side surface; and said first protrusion is a convex lens having a focal point thereof positioned at a side of a center of light emission of said point light source closer to another side surface of said light guide plate that is opposed to said one side surface.

18. A surface light source apparatus comprising:

a point light source having a light emitting surface formed on one surface thereof; and a light guide plate having a hole formed near one side surface thereof, said hole being for storing said point light source, wherein said light emitting surface is arranged opposed to said one side surface in order to cause a light emitted from said light emitting surface to be directed to said one side surface, and said one side surface has formed therein a plurality of recesses each having a recessed shape in a cross-section thereof parallel to a front surface of said light guide plate, a wall surface of the light guide plate that defines a side surface of the hole has a first protrusion protruding toward a center of the hole, the first protrusion is disposed at a portion of the side surface of the hole that is closest to the one side surface, and said first protrusion is a convex lens having a focal point thereof positioned at a side of a center of light emission of said point light source closer to another side surface of said light guide plate that is opposed to said one side surface.

* * * * *